(12) United States Patent
Chen et al.

(10) Patent No.: US 6,975,887 B2
(45) Date of Patent: Dec. 13, 2005

(54) VEHICLE COMMUNICATION SYSTEM CAPABLE OF TRANSMITTING AND RECEIVING A DATA-CARRYING VOICE SIGNAL

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

(*) Notice: Subject to any disclaimer, the term of this patent is extended or adjusted under 35 U.S.C. 154(b) by 555 days.

(21) Appl. No.: 10/040,458

(22) Filed: Jan. 9, 2002

(65) Prior Publication Data

US 2003/0092449 A1    May 15, 2003

(30) Foreign Application Priority Data

Nov. 9, 2001  (TW)  .............................. 90219360 U

(51) Int. Cl.$^7$ .............................................. H04M 1/00
(52) U.S. Cl. ............................... 455/569.2; 455/556.2; 455/556.1; 455/412.1; 342/357.01; 342/357.06; 342/357.1; 701/214; 701/209
(58) Field of Search ........................ 455/569.2, 569.1, 455/556.1, 132, 456.6, 422.1, 90; 342/357.01, 342/357.06, 357.07, 357.09, 357.1, 357.12; 701/209, 208, 213, 215

(56) References Cited

U.S. PATENT DOCUMENTS

| | | | | |
|---|---|---|---|---|
| 5,923,761 A | * | 7/1999 | Lodenius ..................... 455/73 |
| 6,127,969 A | * | 10/2000 | Van Roekel ........... 342/357.13 |
| 6,163,751 A | * | 12/2000 | Van Roekel ................ 701/210 |
| 6,282,491 B1 | * | 8/2001 | Bochmann et al. ......... 701/209 |
| 6,308,133 B1 | * | 10/2001 | Loffert et al. ............... 701/211 |
| 6,320,535 B1 | * | 11/2001 | Hillman et al. ........... 342/357.1 |
| 6,580,375 B2 | * | 6/2003 | Ruhl .......................... 340/988 |
| 6,754,485 B1 | * | 6/2004 | Obradovich et al. ..... 455/414.1 |

* cited by examiner

Primary Examiner—William Trost
Assistant Examiner—Danh C. Le
(74) Attorney, Agent, or Firm—Bacon & Thomas, PLLC

(57) ABSTRACT

A vehicle communication system is disclosed, which includes a voice output device for voice output, a voice pick-up device for voice input, a packet assembler/disassembler unit adapted for assembling different vehicle supplementary system data into respective packet data or disassembling demodulated packet data into corresponding vehicle supplementary system data, a GSM module adapted for transmitting data-carrying voice signal to a remote side or receiving data-carrying voice signal from a remote side, a carrier wave modulator circuit adapted for modulating packet data into analog signal and adding the modulated analog signal to the voice signal from the voice pick-up device to form a data-carrying voice signal for transmitting to a remote side through the GSM module, and a demodulator circuit adapted for demodulating data-carrying voice signal and discriminating the signal into packet data and voice signal.

6 Claims, 3 Drawing Sheets

VEHICLE COMMUNICATION SYSTEM CAPABLE OF TRANSMITTING AND RECEIVING A DATA-CARRYING VOICE SIGNAL

BACKGROUND OF THE INVENTION

1. Field of the Invention

The present invention relates to a communication system and, more particularly, to a vehicle communication system.

2. Description of Related Art

FIG. 1 illustrates the voice signal transmitting and receiving operation of a conventional GSM module 31. Voice Signal is transmitted and received through the GSM module 31. FIG. 2 illustrates the data signal transmitting and receiving operation of a conventional GSM module 32. Data signal is transmitted and received through the GSM module 32. A conventional GSM module 31 can be used to transmit or receive voice signal as well as data signal, however it cannot transmit or receive voice signal and data signal at the same time, i.e., when transmitting or receiving data signal, the GSM module 31 is prohibited from transmitting or receiving data signal. When wishing to transmit voice signal and data signal, two separate phone calls are needed to achieve transmission of voice signal and data signal separately.

Therefore, it is desirable to provide a vehicle communication system that eliminates the aforesaid drawbacks.

SUMMARY OF THE INVENTION

The present invention has been accomplished under the circumstances in view. It is therefore the main object of the present invention to provide a vehicle communication system, which adds data to voice and then transmits the data-carrying voice signal thus obtained to a remote side by a GSM module and, which demodulates data-carrying voice signal received by the GSM module from a remote side into packet data and voice for output separately.

To achieve these and other objects of the present invention, the vehicle communication system comprises a voice pick-up device adapted for picking up external voice signal; a carrier wave modulator circuit adapted for modulating a data into an analog signal and adding the modulated analog signal to the voice signal provided by the voice pick-up device, forming a data-carrying voice signal; a GSM (Global System for Mobile) module adapted for transmitting the data-carrying voice signal provided by the carrier wave modulator circuit to a remote side wirelessly, and receiving an another data-carrying voice signal from a remote side; a voice output device; and a demodulator circuit adapted for demodulating the another data-carrying voice signal received by the GSM module, and discriminating the signal into a voice signal for enabling the voice signal to be outputted through the voice output device, and a data.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
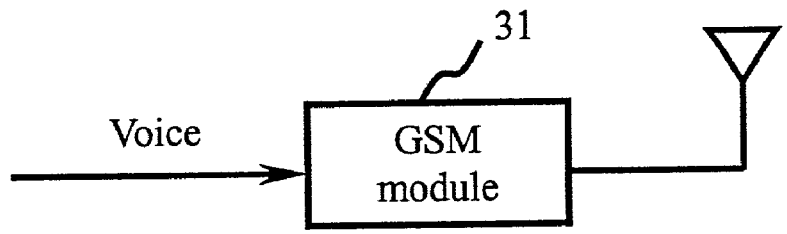
FIG. 1 is a schematic drawing showing the voice signal transmitting and receiving operation of a GSM module according to the prior art.
Figure 2:
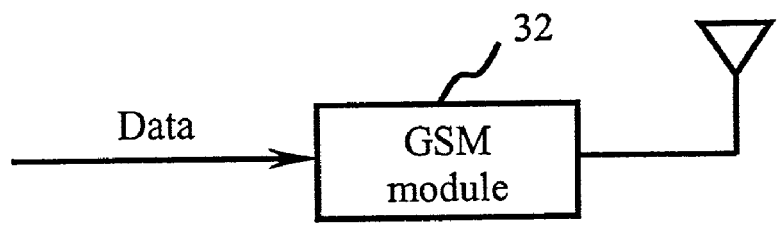
FIG. 2 is a schematic drawing showing the data signal transmitting and receiving operation of a GSM module according to the prior art.
Figure 3:
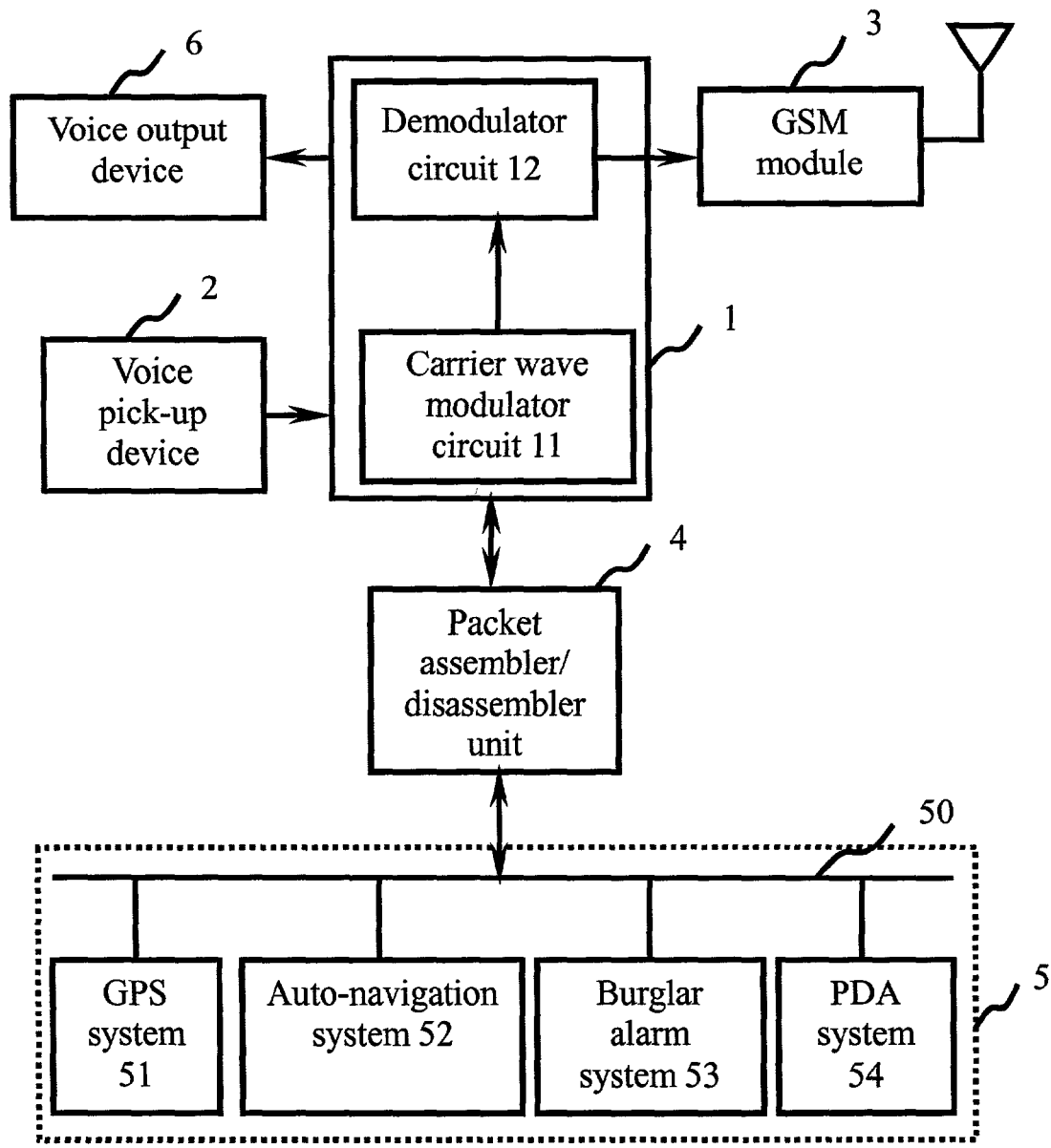
FIG. 3 is a system block diagram of a vehicle communication system according to the present invention.

A vehicle communication in accordance with the present invention, as shown in the functional block diagram of FIG. 3, comprises a voice pick-up device 2, a carrier wave modulator circuit 11, a demodulator circuit 12, a voice output device 6, a GSM module 3, a packet assembler/disassembler unit 4, and vehicle supplementary systems 5. The carrier wave modulator circuit 11 and the demodulator circuit 12 may be combined, forming a carrier wave modulator/demodulator module 1. Further, a data bus 50 is provided between the packet assembler/disassembler unit 4 and the vehicle supplementary systems 5 for data transmission.

The voice pick-up device 2 can be a microphone adapted for picking up external voice signal. Output and input of every vehicle supplementary system 5 are of data type. The vehicle supplementary systems 5 include, for example, GPS (Global Positioning System) system 51, auto-navigation system 52, burglar alarm system 53, or PDA (Personal Digital Assistant) system 54, . . . etc. Every vehicle supplementary system 5 can be separately operated, and several vehicle supplementary systems 5 can simultaneously be used. All the vehicle supplementary systems 5 can respectively transmit data to the packet assembler/disassembler unit 4 through the data bus 50. The packet assembler/disassembler unit 4 assembles or disassembles received data. The carrier wave modulator circuit 11 receives assembled packet data from the packet assembler/disassembler unit 4 and voice signal from the voice pick-up device 2, modulates the data into an analog signal, and adds the analog signal to the voice signal, forming a data-carrying voice signal. The GSM module 3 sends the data-carrying voice signal from the carrier wave modulator circuit 11 to the remote side wirelessly, and receives another data-carrying voice signal from the remote side. The demodulator circuit 12 demodulates the data-carrying voice signal received by the GSM module 3, enabling data to be separated from the voice signal, and then directly transfers the data to the packet assembler/disassembler unit 4 for disassembling. The packet assembler/disassembler unit 4 disassembles the data outputted from the demodulator circuit 12, and then sends the disassembled data to the vehicle supplementary systems 5 through the data bus 50. The voice output device 6 can be, for example, a speaker adapted for output of demodulated voice signal.

Figures 4, 5:
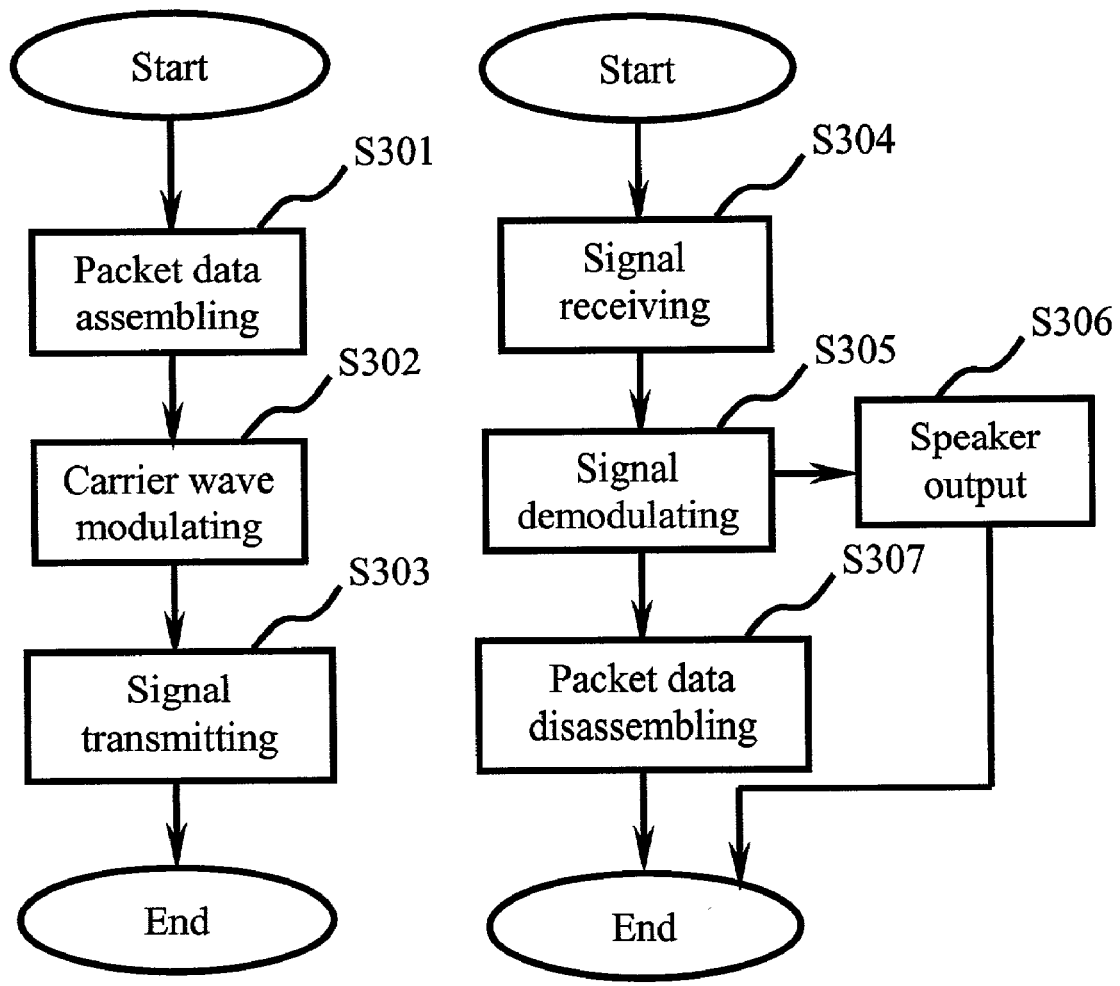
FIG. 4 is a flow chart illustrating the data-carrying voice signal transmitting action of the vehicle communication system according to the present invention.
FIG. 5 is a flow chart illustrating the data-carrying voice signal receiving action of the vehicle communication system according to the present invention.

FIG. 4 is a block diagram illustrating the data-carrying voice signal transmitting action of the vehicle communication system. When wishing to transmit data and voice signal to the remote side and the data to be transmitted including data from the PDA system 54 and data from the auto-navigation system 52, the data from the PDA system 54 and the data from the auto-navigation system 52 are transferred to the packet assembler/disassembler unit 4 through the data bus 50, and then the packet assembler/disassembler unit 4 assembles the received two data into a packet data (Step 301) and transfers the packet data to the carrier wave modulator circuit 11 of the carrier wave modulator/demodulator module 1. The carrier wave modulator circuit 11 of the carrier wave modulator/demodulator module 1 immediately modulates the packet data into an analog signal, and then adds the analog signal to the voice signal received from the voice pick-up device 2, forming a data-carrying voice signal (Step 302), which is then transmitted to the remote side through the GSM module 3 (Step 303).

FIG. 5 is a block diagram illustrating the data-carrying voice signal receiving action of the vehicle communication system. Upon receipt of a data-carrying voice signal from a remote side by the GSM module 3 (Step 304), the GSM module 3 immediately transfers the data-carrying voice signal to the demodulator circuit 12 of the carrier wave modulator/demodulator module 1 where the data-carrying voice signal to the demodulator circuit 12 demodulates the data-carrying voice signal into packet data and voice signal (Step 305). The voice signal thus discriminated is then outputted through the voice output device 6 (Step 306), and the packet data thus discriminated is then transferred to the packet assembler/disassembler unit 4 where the packet assembler/disassembler unit 4 disassembles the packet data and classifies the disassembled data subject to its column value or particular bit (Step 307), enabling the auto-navigation system 52 to obtain navigation information, the PDA system 54 to obtain stock market information.

As indicated above, the invention uses a packet assembler/disassembler unit to assemble different vehicle supplementary system data into respective packet data or disassemble demodulated packet data into corresponding vehicle supplementary system data, a GSM module to transmit/receive data-carrying voice signal, a carrier wave modulator circuit to modulate packet data into analog signal and to add the modulated analog signal to a voice signal to form a data-carrying voice signal for transmitting to a remote side through the GSM module, and a demodulator circuit to demodulate data-carrying voice signal and discriminate the signal into packet data and voice signal.

Although the present invention has been explained in relation to its preferred embodiment, it is to be understood that many other possible modifications and variations can be made without departing from the spirit and scope of the invention as hereinafter claimed.

What is claimed is:

1. A vehicle communication system comprising:
    a voice pick-up device adapted for picking up an external voice signal;
    a carrier wave modulator circuit adapted for modulating data into an analog signal and adding the modulated analog signal to the voice signal provided by said voice pick-up device, forming a data-carrying voice signal;
    a GSM (Global System for Mobile) module adapted for transmitting the data-carrying voice signal provided by said carrier wave modulator circuit to a remote side wirelessly, and for wirelessly receiving another data-carrying voice signal;
    a voice output device; and
    a demodulator circuit adapter for demodulating the another data-carrying voice signal received by said GSM module, and discriminating the signal into a voice signal and a received data signal for enabling the voice signal to be outputted through said voice output device, and the data signal to be separately output to at least one vehicle supplementary system, said at least one vehicle supplementary system including a PDA (personal digital assistant) system.

2. The vehicle communication system as claimed in claim 1 further comprising a packet assembler/disassembler unit adapted for assembling the data to be modulated by said carrier wave modulator circuit into packet data, and disassembling packet data outputted from said demodulator circuit received by said GSM module.

3. The vehicle communication system as claimed in claim 1 further comprising a data bus adapted for transferring data between the packet assembler/disassembler and said at least one vehicle supplementary system.

4. The vehicle communication system as claimed in claim 1, wherein said at least one vehicle supplementary system includes a GPS (Global Positioning System) system.

5. The vehicle communication system as claimed in claim 1, wherein said at least one vehicle supplementary system includes an auto-navigation system.

6. The vehicle communication system as claimed in claim 1, wherein said at least one vehicle supplementary system includes a burglar alarm system.

* * * * *